United States Patent

Tanaka et al.

[11] Patent Number: 5,944,543
[45] Date of Patent: Aug. 31, 1999

[54] CABLE HOLDING STRUCTURE

[75] Inventors: Hiraku Tanaka; Satoshi Ishikawa; Nobuyuki Tsujino; Takashi Yanagihara, all of Shizuoka-ken, Japan

[73] Assignee: Yazaki Corporation, Tokyo, Japan

[21] Appl. No.: 08/784,933

[22] Filed: Jan. 16, 1997

[30] Foreign Application Priority Data

Jan. 18, 1996 [JP] Japan .................................. P8-006805
Aug. 13, 1996 [JP] Japan .................................. P8-213923

[51] Int. Cl.⁶ .................................................. H01R 35/04
[52] U.S. Cl. ............................................................ 439/164
[58] Field of Search .............................. 439/164, 15, 16

[56] References Cited

U.S. PATENT DOCUMENTS 4,657,326  4/1987  Zeller et al. .............................. 439/16
5,607,316  3/1997  Ishikawa .................................. 439/164
5,700,153  12/1997 Kawamura et al. ..................... 439/164

FOREIGN PATENT DOCUMENTS 2-41150  9/1990  Japan .

Primary Examiner—Paula Bradley
Assistant Examiner—Tho D. Ta
Attorney, Agent, or Firm—Finnegan, Henderson, Farabow, Garrett & Dunner, L.L.P.

[57] ABSTRACT

A cable holding structure of this invention comprises a groove in which a bending portion of a flexible flat cable is to be inserted, a first opening portion through which the flexible cable extending in the X direction as one direction from the bending portion passes and a second opening portion through which the flexible cable extending in the Y direction as the other direction from the bending portion passes, the first and second opening portions being contained in the groove, and a stopper provided on the first opening portion, which contacts a side edge of the flexible cable extending in the Y direction as the other direction of the bending portion so as to prevent the bending portion from slipping out in the X direction as one direction. Consequently, this prevents a residual stress from being generated in the flexible flat cable thereby improving the service life of the flexible flat cable.

6 Claims, 8 Drawing Sheets

CABLE HOLDING STRUCTURE

BACKGROUND OF THE INVENTION

1. Field of the Invention

This invention relates to a cable holding structure for holding a flexible flat cable at its predetermined positions.

2. Description of the Related Art

Cable holding structures of the related art are constructed in a manner such that a internal periphery end portion of a roll-shaped wound flexible cable is bent in an orthogonal direction, and the bent portion is surrounded and formed with a block means by insert molding in the injection molding machine or the like. The block means is inserted into a holder portion formed in an internal cylindrical portion so that the bent portion is held in the internal cylindrical portion.

On the other hand, the bent portion at the external periphery end portion of the flexible flat cable is bent in an orthogonal direction is also surrounded and fixed with a block means by insert molding in the injection molding machine or the like. The block means is also inserted into a holder portion formed in an external cylindrical portion so that the bent portion is held in the external cylindrical portion.

However, because the above-described cable holding structure is formed by surrounding and fixing the bent portion of the flexible flat cable by insert molding, the bent portions are directly subject to high temperatures and high pressures at the time of insert molding. Thus, a residual stress occurs at the bent portion of the flexible flat cable due to heat and pressure in resin so that the flexible flat cable becomes likely to be broken at its bent portion by a force applied to the flexible flat cable from, for example, the internal cylindrical portion and the external cylindrical portion and the like.

SUMMARY OF THE INVENTION

The present invention is conceived to solve the above described problem. It is an object of the invention to provide a cable holding structure capable of improving the service life of the flexible flat cable by avoiding the generation of the residual stress in the resin of the flexible flat cable due to high temperatures and high pressures by means of the insert molding.

Another object of the present invention is to provide a cable holding structure capable of holding the flexible flat cable further securely by generating a friction between a guiding face for guiding the flexible flat cable to the external wall face and the flexible flat cable by turning back at least one of the flexible flat cables extending in one direction as a first direction and in the other direction as a second direction.

A further object of the present invention is to provide a cable holding structure capable of holding the flexible flat cable further firmly by providing holding means for holding the flexible flat cable such that a turned portion thereof is pressed against the external wall face.

A still further object of the present invention is to provide a cable holding structure capable of stabilizing the directions of the flexible flat cable at the portion out of the cable holding structure by guiding the turned portions of the flexible flat cable in each of predetermined directions by guiding means.

To achieve the above objects of the present invention, there is provided a cable holding structure for holding a bent portion of a flexible cable formed in a belt-like shape by bending the flexible flat cable at a predetermined portion thereof. The cable holding structure comprises a groove in which the bent portion of the flexible cable is to be inserted, a first opening portion through which the flexible flat cable extending in one direction from the bent portion passes and a second opening portion through which the flexible flat cable extending in the other direction from the bending portion passes which are contained by the groove, and a stopper provided on the first opening portion. The stopper contacts a side edge of the flexible flat cable extending in the other second direction of the bending portion so as to prevent the bending portion from slipping out in the one direction.

According to another aspect of the present invention, the cable holding structure further comprises a stopper provided on the second opening portion, which contacts a side edge of the cable extending in one direction of the bending portion so as to prevent the bending portion from slipping out in the other direction.

According to a further aspect of the present invention, the groove comprises a first wall portion and a second wall portion. One appropriate side of the first wall portion or the second wall portion includes a guiding face for turning back at least one of the flexible flat cables extending in one and the other directions along the external wall face of one of the first wall portion and the second wall portion.

According to a still further aspect of the present invention, the cable holding structure further comprises a holding means for holding the flexible flat cable such that the turned portion of the flexible flat cable is pressed against the external wall face.

According to a yet still further aspect of the present invention, the cable holding structure further comprises a guiding means for guiding the turned portion of the flexible flat cable in a predetermined direction along the external wall face.

In the cable holding structure having the above construction according to the present invention, by inserting the bent portion of the flexible flat cable into the groove, the side edge of the flexible flat cable extending in the other direction relative to the bending portion contacts the stopper, so that the flexible flat cable is prevented from being moved in one direction. Thus, there is such an effect that the flexible flat cable extending in one direction can be held securely.

Since the bending portion of the flexible flat cable is only inserted into the groove, no residual stress is generated in the flexible flat cable by resin of high temperatures and high pressure due to insert molding unlike in the related art. Thus, a troublesome manufacturing process of insert molding can be avoided and the service life of the flexible flat cable can be improved.

As the stopper is provided at the second opening portion which contacts the side edge of the flexible flat cable extending in one direction of the bent portion to prevent the bent portion from slipping out in the other direction, the flexible flat cable extending in the other direction can be held securely so as to be prevented from being moved in the other direction.

Because at least one of the flexible flat cables extending in one direction and the other direction is turned back along the external wall face of one of the first wall portion and the second wall portion, when the flexible flat cable is pulled in the direction of turning back, a friction is generated between the guiding face for guiding the flexible flat cable from the groove to the external wall face and the flexible flat cable.

Thus, by turning back the flexible flat cable, the flexible flat cable can be held further securely.

Further, because the holding means is provided for holding the flexible flat cable such that the turned portion thereof is pressed against the external wall face, a friction is generated between the holding means and the turned portion, and between the external wall face and the turned portion. Thus, the flexible flat cable can be held further firmly.

Still further, the direction of the flexible flat cable after being turned back can be guided to a predetermined direction by the guiding means. Thus, the direction of the flexible flat cable after being turned back can be stabilized.

DESCRIPTION OF THE PREFERRED EMBODIMENTS

Figure 1:
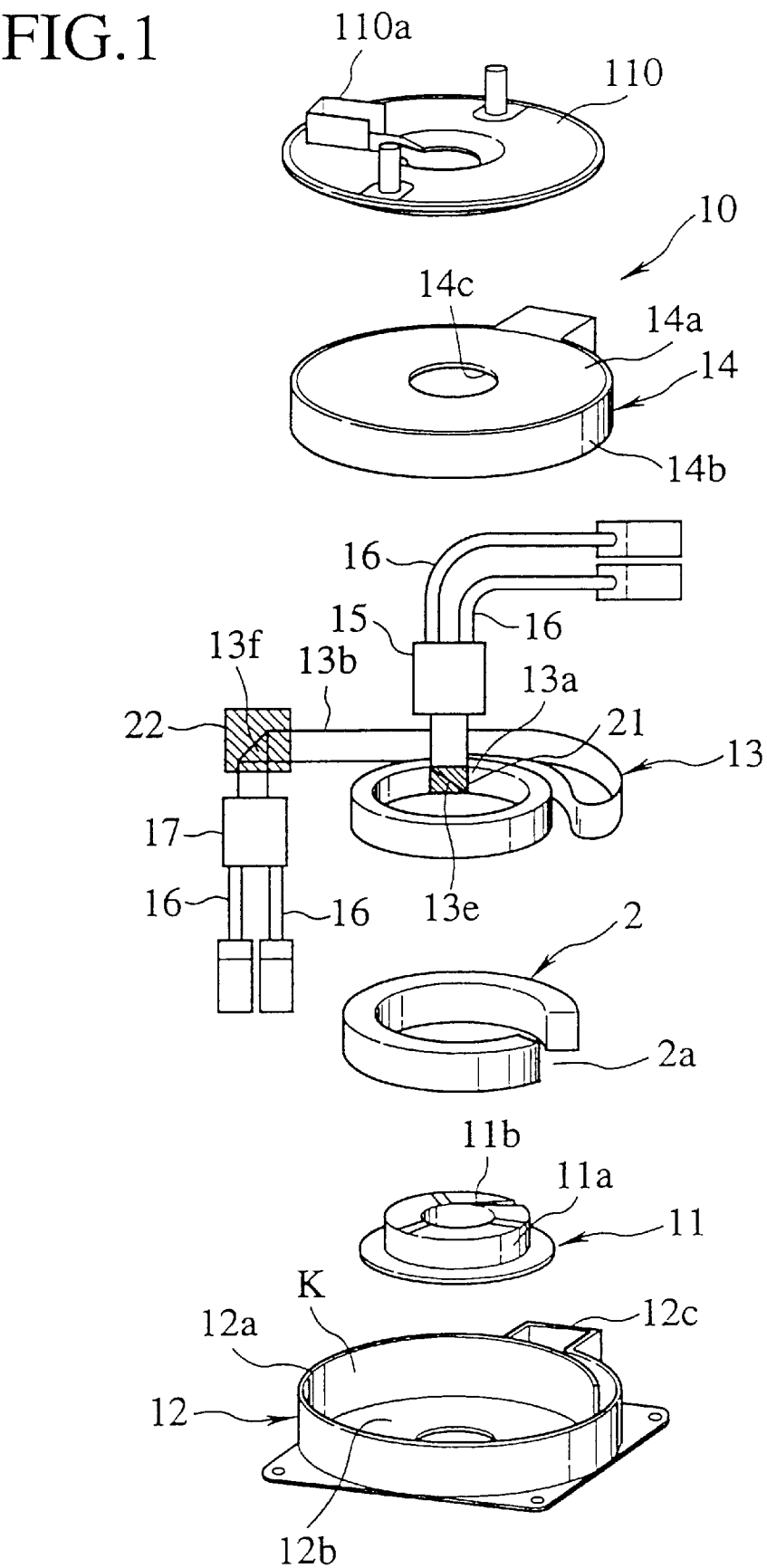
FIG. 1 is an exploded perspective view showing the entire structure of a signal transmission device for relatively rotating members which is provided with a cable holding structure shown as a first embodiment of the present invention.
Figure 2:
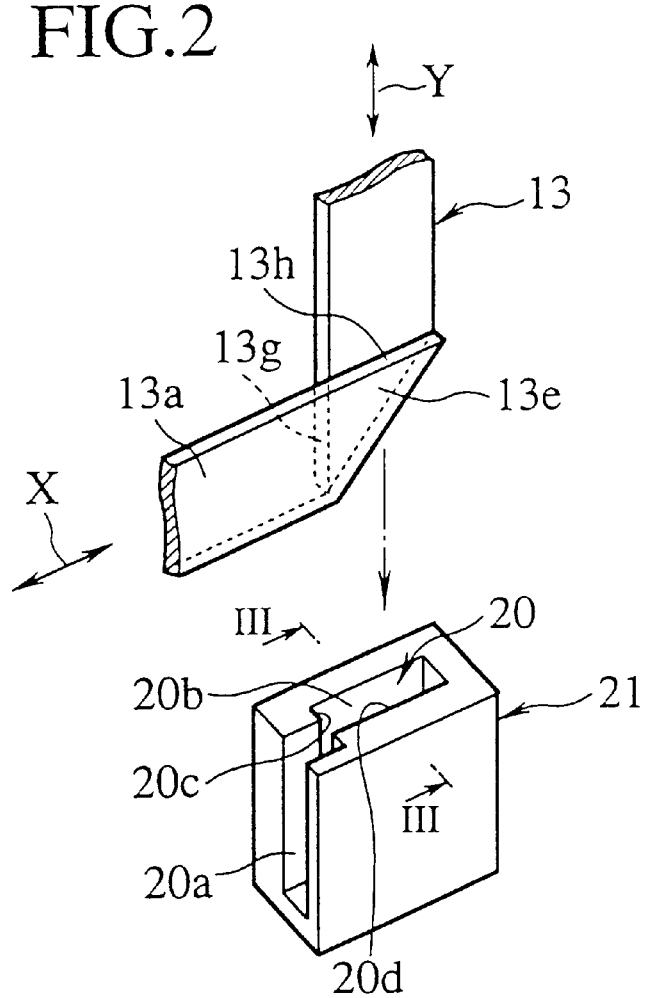
FIG. 2 is an exploded perspective view of the cable holding structure.
Figure 3:
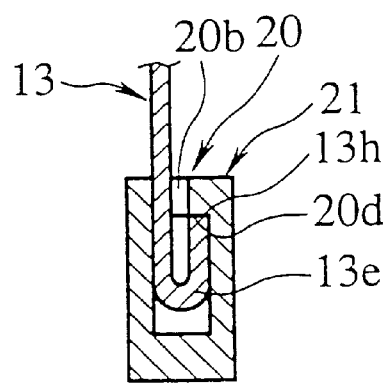
FIG. 3 is a sectional view of the cable holding structure, taken along the line III—III in FIG. 2.
Figure 4:
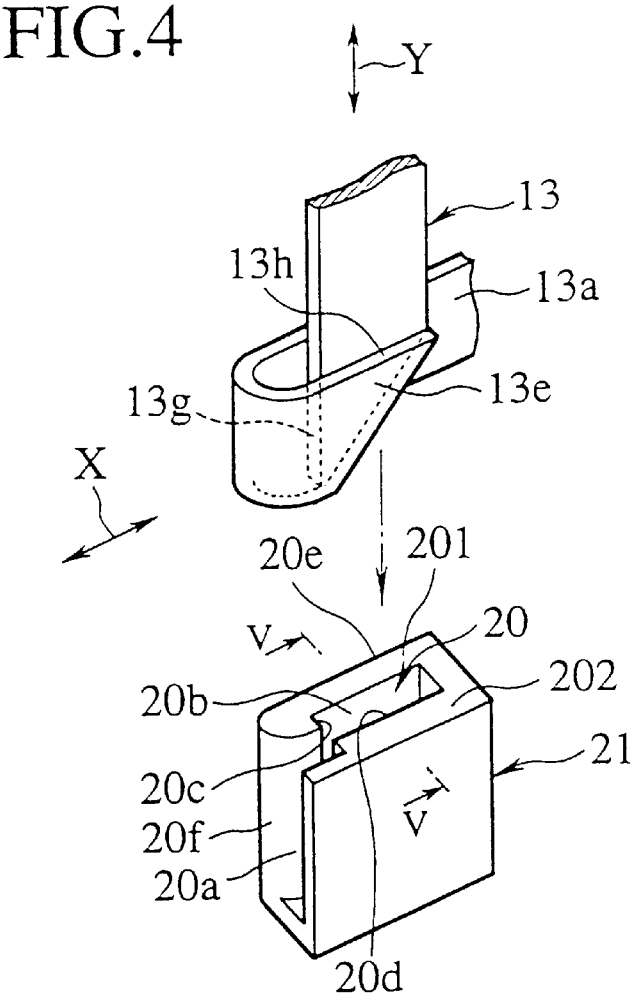
FIG. 4 is an exploded perspective view of the cable holding structure shown as a second embodiment of the present invention.
Figure 5:
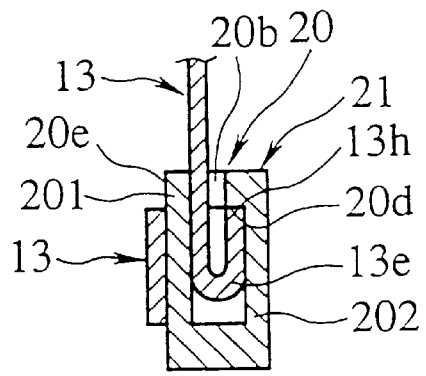
FIG. 5 is a sectional view of the cable holding structure, taken along the line V—V in FIG. 4.
Figure 6:
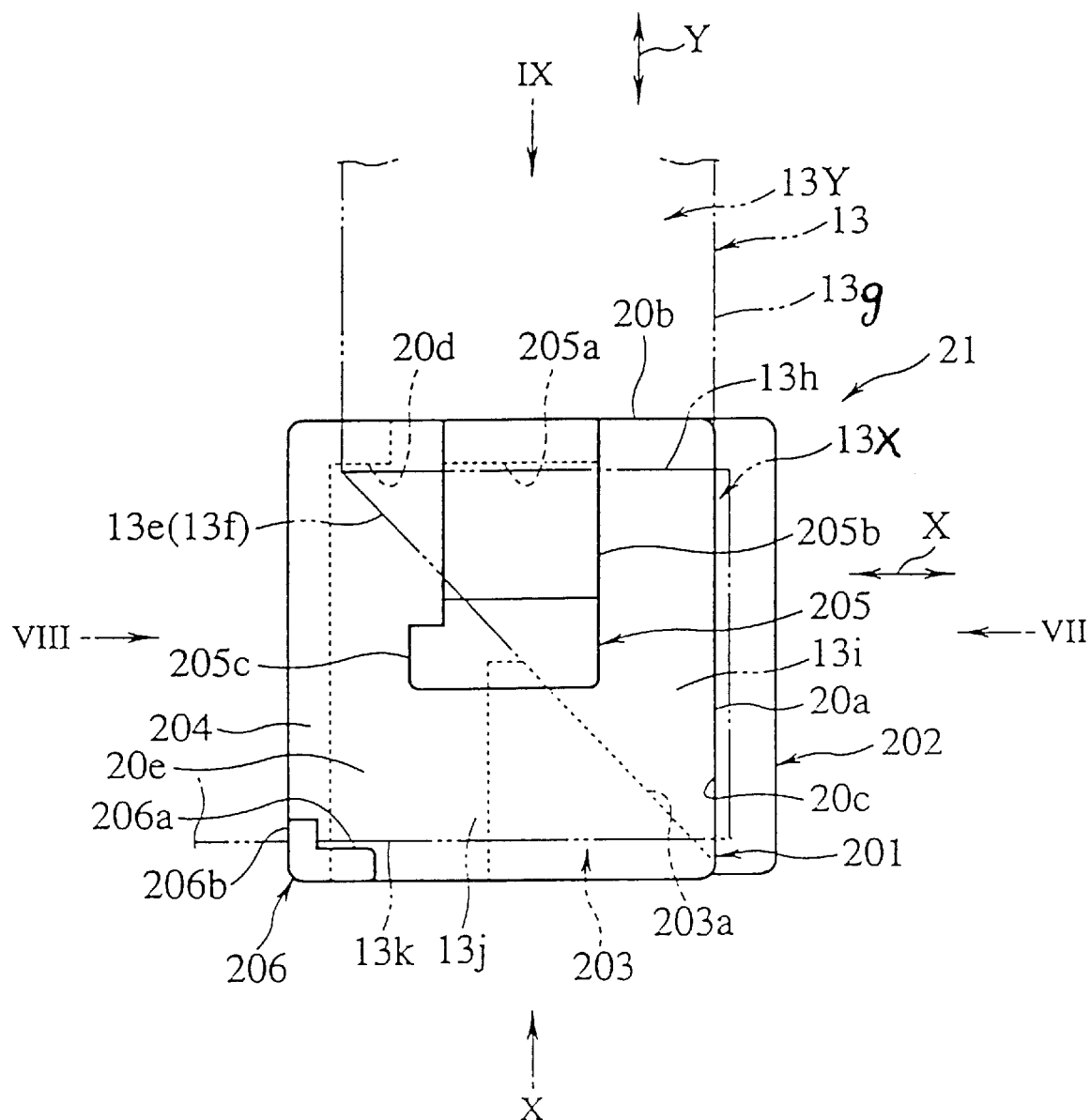
FIG. 6 is a front view showing the cable holding structure shown as a third embodiment of the present invention.
Figure 7:
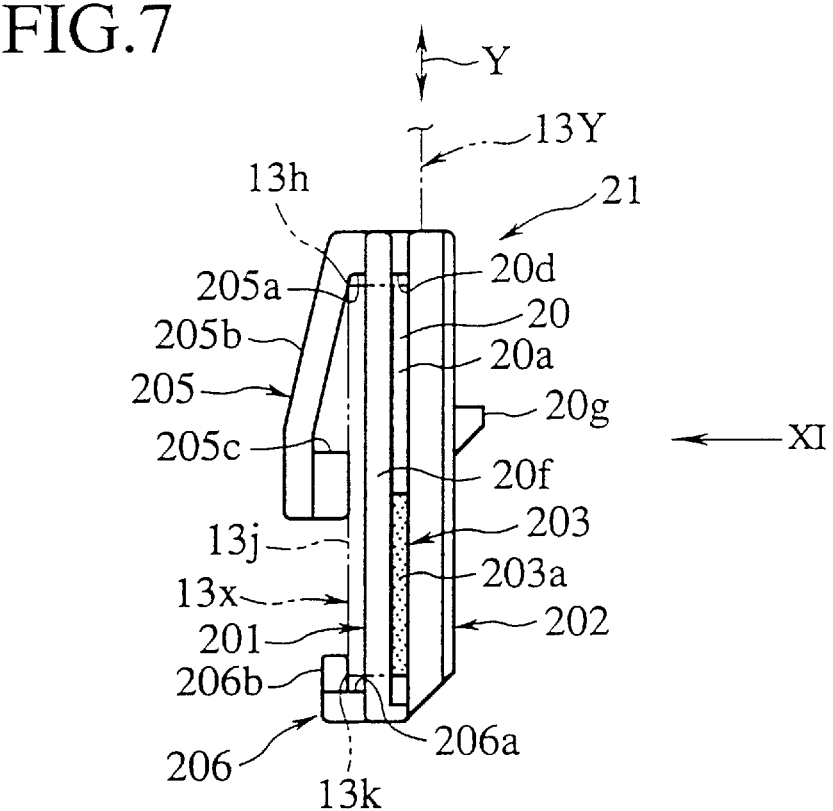
FIG. 7 is a side view of the cable holding structure, taken in the direction of the arrow VII in FIG. 6.
Figure 8:
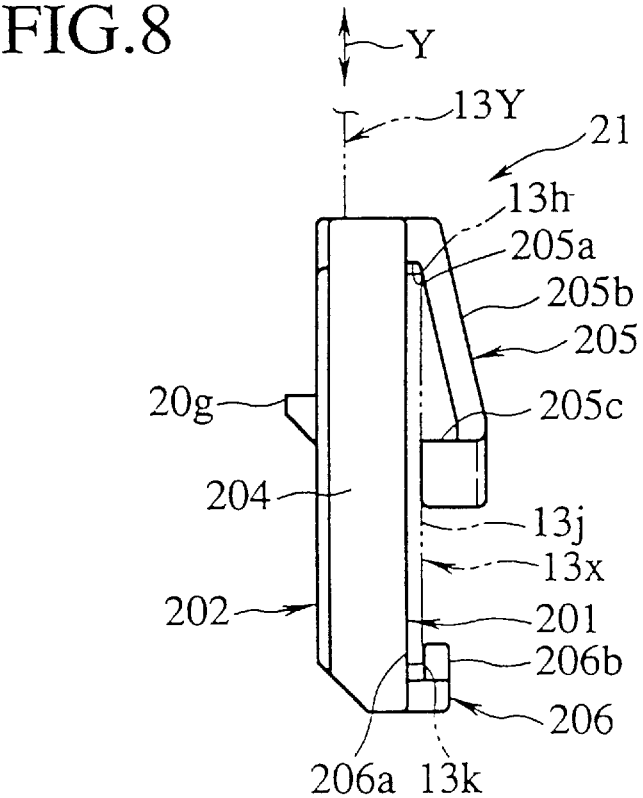
FIG. 8 is a side view of the cable holding structure, taken in the direction of the arrow VIII in FIG. 6.

Hereinafter, embodiments of the present invention will be described with reference to the accompanying drawings. FIGS. 1–3 show a first embodiment, FIGS. 4–5 show a second embodiment and FIGS. 6–14 show a third embodiment.

First, the first embodiment thereof will be described with reference to FIGS. 1–3. FIG. 1 is an exploded perspective view showing the entire structure of a signal transmission device for relatively rotating members which is provided with the cable holding structure shown as a first embodiment of the present invention.

The signal transmission device for relatively rotating members 10 comprises a rotary member (rotary member) 11 having an internal cylindrical portion 11a, a fixed member 12 having an external cylindrical portion 12a with a predetermined distance therebetween, a cable (flexible flat cable) 13 stored within a circular space K disposed between the internal cylindrical portion 11a and the external cylindrical portion 12a such that it is wound along the space K in the form of a spiral, in which the internal periphery end portion 13a of the cable 13 is held in the internal cylindrical portion 11a and the external periphery end portion 13b is held in the external cylindrical portion 12a, and a C-shaped moving member 2 movably disposed along the space K in which the cable 13 is turned back at an opening portion 2a thereof. Cable 13 is an output of internal connector 15 from which a plurality of cable 16 are input. Cable 13 extends through a cable holding structure 22, and enters internal connector 17. Internal connector 17 then outputs a plurality of cables, also referred to as reference number 16.

The rotary member 11 has a holder portion 11b for holding the cable holding structure 21 of the invention, disposed at the internal periphery end portion 13a of the cable 13, which will be described in detail below.

On the other hand, the fixed member 12 is provided with a covering member 14 for covering the top side of the space K and the periphery of the external cylindrical portion 12a. This covering member 14 comprises an upper cover 14a for covering the top side of the space K and a cylindrical portion 14b for covering the periphery of the external cylindrical portion 12a, and is structured not so as to rotate relatively to the fixed member 12. An opening portion 14c is formed in the center of the upper cover 14a. Further, a bottom cover 12b is formed in the fixed member 12 integratedly with the external cylindrical portion 12a so as to cover the bottom side of the space K. Further, the external cylindrical portion 12a includes a holder portion 12c for holding the cable holding structure 22 of the present invention, disposed at the external periphery end portion 13b of the cable 13, which will be described in detail below.

An externally introducing cover 110 for introducing the cable 13 is rotatably provided externally above the covering member 14. The externally introducing cover 110 is connected to the internal cylindrical portion 11a through the opening portion 14c in the covering member 14 so that it can rotate together with the internal cylindrical portion 11a. Then, this externally introducing cover 110 has a connector holder portion 110a for holding the internal connector 15 which is connected to the cable 13 and covered wires 16.

The above rotary member 11 is coupled with a steering wheel side in a steering wheel of a vehicle so as to achieve electrical connection between the cable 13 and the steering side through the internal connector 15 and the covered wires 16. Furthermore, the fixed member 12 is fixed to a steering column side thereof in order to achieve electrical connection the steering column side and the steering side through the cable 13.

The cable holding structure 21 of the present invention is structured so as to hold a bent portion 13e at the internal periphery end portion 13a of the cable (flexible flat cable) 13 made as the form of a belt as shown in FIGS. 1–3, without use of insert molding in the injection molding machine.

As shown in FIGS. 2, 3, the cable 13 has the bent portion 13e which is bent at right angle such that a portion extending in X direction and a portion extending in Y direction are crossed orthogonally with respect to this bent portion 13e. Then, the cable 13 extending in X direction is disposed within the space K (see FIG. 1) and the cable 13 extending in Y direction is introduced to the externally introducing cover 110 (see FIG. 1) and the cable is fixed to the connector holder portion 110a through the internal connector 15.

Further, the cable holding structure 21 is formed in the shape of a square block and this block has a groove 20 in which the bent portion 13e of the cable 13 is inserted. The groove 20 comprises a first opening portion 20a through which the cable 13 extending in X direction passes and a second opening portion 20b through which the cable 13 extending in Y direction passes. Then, the first opening portion 20a has a stopper 20c contacting a side edge 13g of the cable 13 extending in Y direction in the bent portion 13e to prevent the bent portion 13e from slipping out in X direction. Further, as shown in FIG. 3, the second opening portion 20b has a stopper 20d contacting a side edge 13h of the cable 13 extending in X direction in the bent portion 13e to prevent the bent portion 13e from slipping out in Y direction. As shown in FIG. 1, this cable holding structure 21 is inserted into the holder portion 11b of the internal cylindrical portion 11a so as to be secured by the rotary member 11.

On the other hand, the bent portion 13f at the external periphery end portion 13b of the cable 13 is formed so that one side of the cable 13 is crossed at right angle to the other side thereof as in the bent portion 13e of the above internal periphery end portion 13a. The cable 13 extending from the bent portion 13f in Y direction is introduced outside through a holder portion 12c provided in the external cylindrical portion 12a as shown in FIG. 1. The cable holding structure 22 for holding the bending portion 13f is formed in the same configuration as the above cable holding structure 21. This cable holding structure 22 is inserted into the holder portion 12c in the external cylindrical portion 12a as shown in FIG. 1 so as to be secured by the fixed member 12.

In the cable holding structure 21 having the above described construction, by inserting the bent portion 13e of the cable 13 into the groove 20 shown in FIG. 2, the side edge 13g of the cable 13 extending in Y direction contacts the stopper 20c so that the cable 13 is prevented from being moved in X direction. Further, as shown in FIG. 2, the side edge 13h of the cable 13 extending in X direction contacts the stopper 20d so that the cable 13 is prevented from being moved in Y direction. Thus, the cable is secured both in X direction and Y direction.

Further, because the bent portion 13e of the cable 13 is only inserted into the groove 20, no residual stress is generated in the cable 13 by resin in high temperatures and high pressure caused by insert molding unlike in the related art. Thus, the service life of the cable 13 can be extended.

Further, because a troublesome manufacturing process of insert molding can be unnecessary, the production efficiency can be improved.

Next, a second embodiment of the present invention will be described with reference to FIGS. 4, 5. The same reference numerals are attached to the same components shown in FIGS. 1–3 as those of the first embodiment anda description thereof is simplified. A different point of the first embodiment from the second embodiment is that the cable extending in X direction is curved such that it is turned backward from the first opening portion 20a.

That is, the cable holding structure 21 is configured so as to turn the cable 13 extending in X direction backward from the first opening portion 20a along the external wall face 20e. Namely, a portion extending from the opening portion 20a to the external wall face 20e acts as a guiding face 20f for turning back the cable 13. This guiding face 20f is formed in the form of a smooth curve like for example a cylindrical face. The above groove 20 is formed between a first wall portion 201 and a second wall portion 202 which face each other in parallel thereto.

The cable holding structure 22 is constructed in the same fashion as the above cable holding structure 21.

In the cable holding structure having the above-described construction, by turning back the cable 13 extending in X direction through the guiding face 20f, a friction is generated between the cable 13 and the guiding face 20f. Thus, the holding force for the cable 13 extending in X direction can be further raised such that the cable 13 can be held securely.

Meanwhile, although the above first and second embodiments of the present invention are structured so that the stoppers 20c and 20d are provided in X direction and Y direction respectively, in case a force acts on the cable 13 from only, for example, X direction, it is permissible to design such a construction in which the stopper 20d in Y direction is omitted.

Further, although the X direction and the Y direction are structured so as to cross each other orthogonally, it is permissible not to have such an orthogonal crossing construction. Namely, the cable 13 may be structured such that it is bent at other angles than right angle at the bent portions 13e, 13f. In this case, the above stoppers 20c, 20d are formed so as to correspond to that appropriate angle.

Further, although the cable holding structures 21, 22 are configured separately from the internal cylindrical portion 11a and the external cylindrical portion 12a respectively, these cable holding structures 21, 22 may be configured integratedly with the internal cylindrical portion 11a and the external cylindrical portion 12a respectively.

On the other hand, although the above second embodiment is structured such that the cable 13 extending in X direction is turned back along the first wall portion 201, it is permissible that the cable 13 extending in the X direction is turned back along the second wall portion 202. In this case, it is preferable that the second wall portion 202 is also provided with a smoothly curved guiding face (20f). Likewise, it is permissible to have such a construction so as to turn back the cable 13 extending in the other direction of Y along the first wall portion 201 or the second wall portion 202. Further, it is permissible to have such a construction so as to turn the cables 13 extending in X and Y directions along the first wall portion 201 and the second wall portion 202 respectively in one cable holding structure 21 or 22.

Next, a third embodiment of the present invention will be described with reference to FIGS. 6–14. The same reference numerals are attached to the same components thereof as those of the first and second embodiments shown in FIGS. 1–5.

In the cable holding structure according to the third embodiment of the present invention, as shown in FIGS. 6–14, the cable 13 is bent back at a bent portion 13e placed along an oblique line at 45° such that the cable 13X extending in X direction from this bent portion 13e and the cable 13Y extending in Y direction in orthogonal direction relative to this cable 13X are formed and a triangle-shaped overlapping portion 13i of the cable 13 to be held thereby.

Then, the cable holding structure 21 has the first wall portion 201 and the second wall portion 202 which are provided so as to surround the overlapping portion 13i from both sides. The first wall portion 201 has a stopper 20d for contacting a side edge 13h which is a side edge of one side of the cable 13X extending in X direction and which is a portion thereof extending into the overlapping portion 13i. The second wall portion 202 has a stopper 20c for contacting a side edge 13g which is a side edge of one side of the cable 13Y extending in Y direction and is a portion thereof extending into the overlapping portion 13i.

The first wall portion 201 and the second wall portion 202 are structured to form a groove 20 by square shaped sheet members facing each other in parallel, and are interconnected by a triangle-shaped guiding portion 203 having a slope 203a and an interconnecting edge portion 204 located opposite to the stopper 20c. The slope 203a of the above guiding portion 203 guides the bending portion 13e of the cable 13.

Further, the first wall portion 201 and the second wall portion 202 have a first opening portion 20a through which the cable 13X extending in X direction passes and a second opening portion 20b through which the cable 13Y extending in Y direction passes. These first and second opening portions 20a, 20b are structured so as to be continuously open even at an angle portion where both thereof collide with each other.

Figure 9:
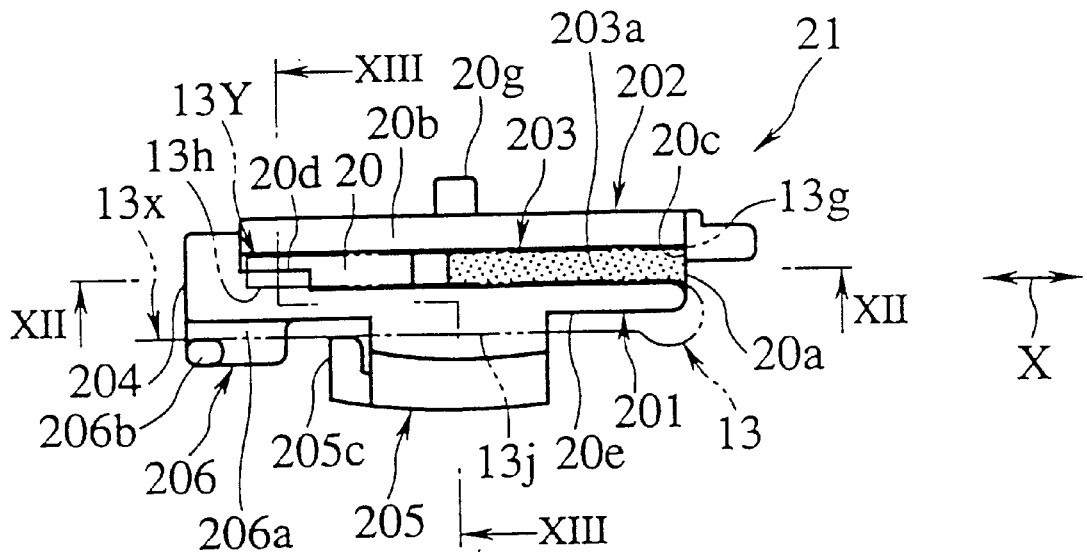
FIG. 9 is a plan view of the cable holding structure, taken in the direction of the arrow IX in FIG. 6.
Figure 10:
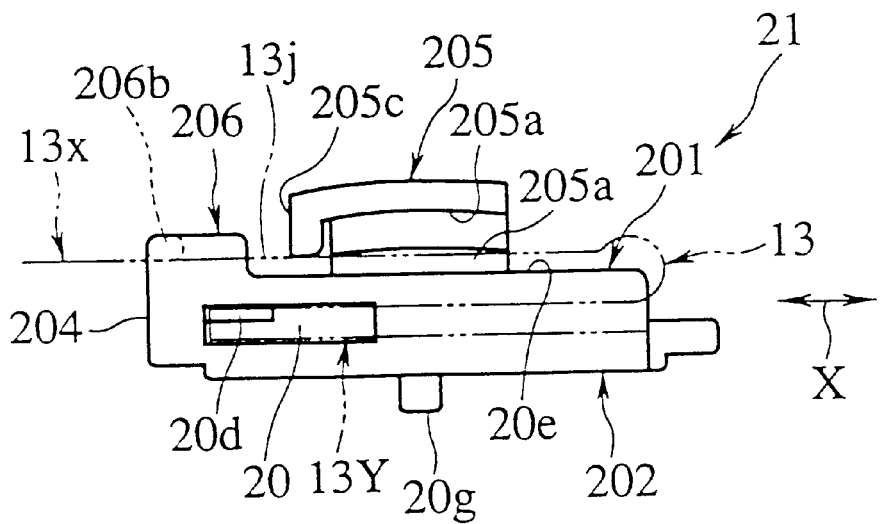
FIG. 10 is a bottom view of the cable holding structure, taken in the direction of the arrow X in FIG. 6.
Figure 11:
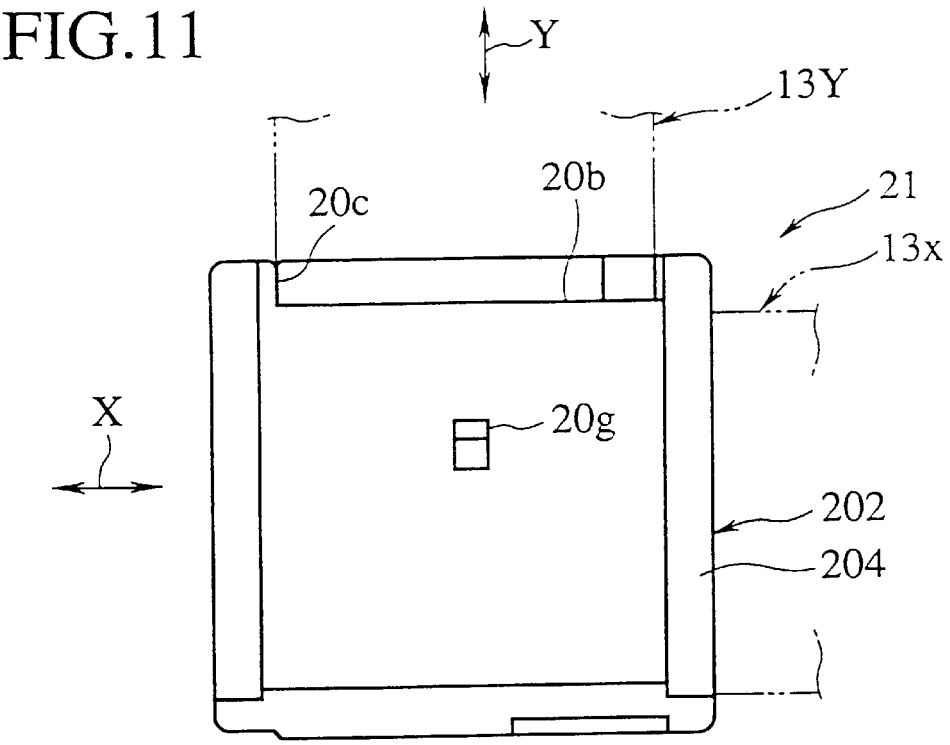
FIG. 11 is a rear view of the cable holding structure, taken in the direction of the arrow XI in FIG. 7.
Figure 12:
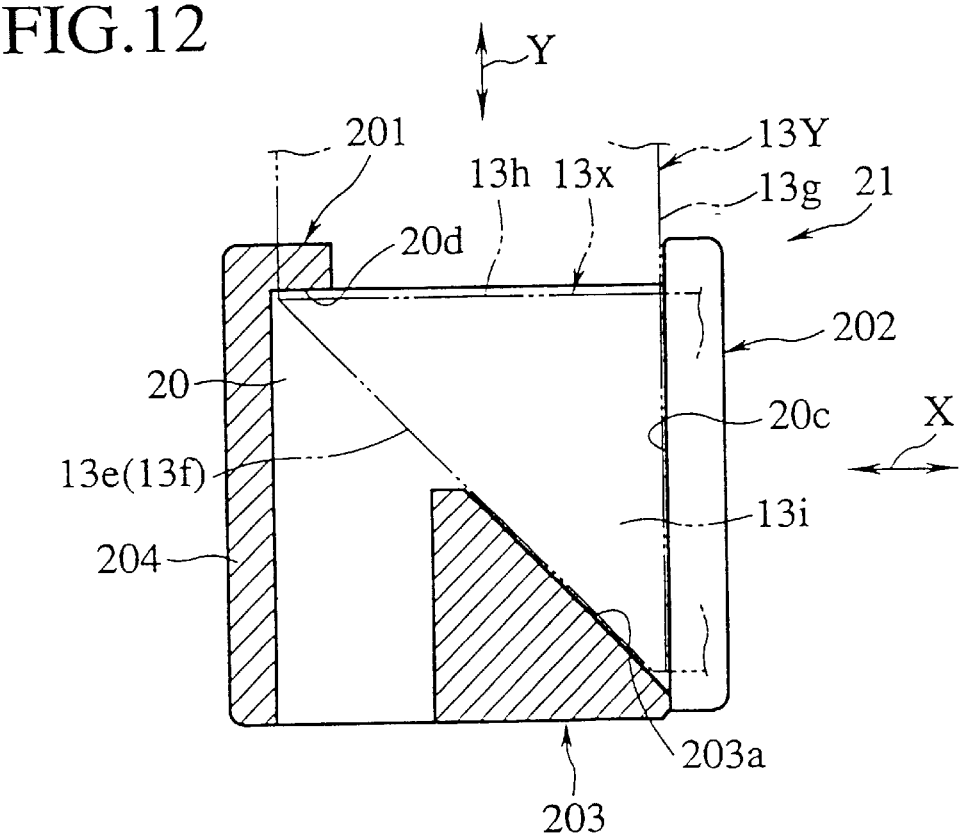
FIG. 12 is a sectional view of the cable holding structure, taken along the line XII—XII in FIG. 9.
Figure 13:
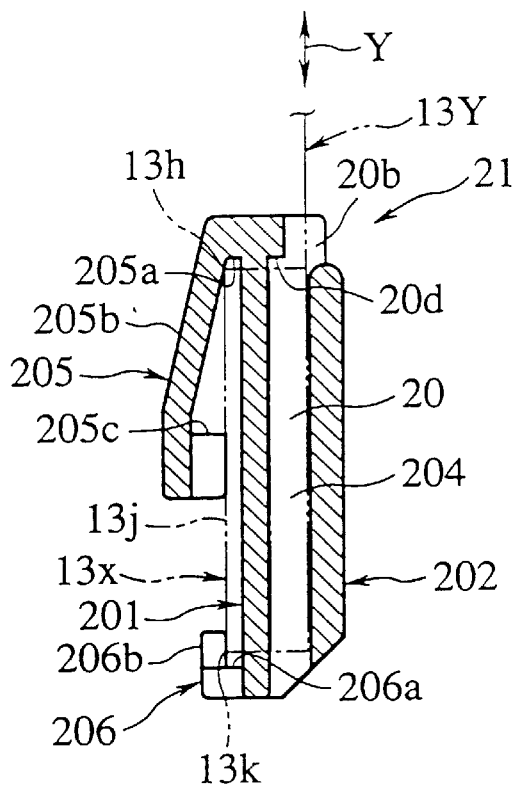
FIG. 13 is a sectional view of the cable holding structure, taken along the line XIII—XIII in FIG. 9.
Figure 14:
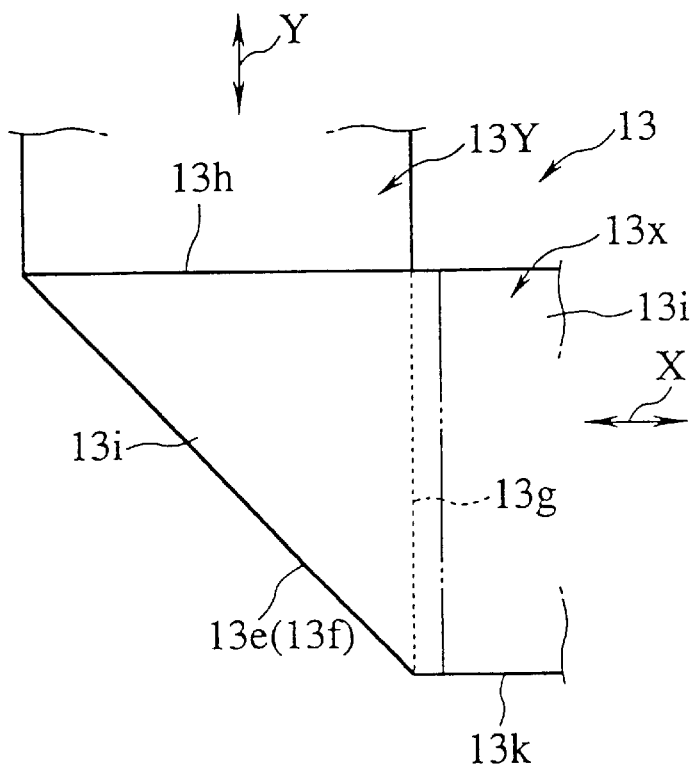
FIG. 14 is a front view of the bent portion of the flexible flat cable.

Further, the cable 13X extending in X direction is turned back outward of the first wall portion 201 and overlapped on the external wall face 20e of the first wall portion 201. The first wall portion 201 has a holding means 205 for pressing and fixing a turned portion 13j of the cable 13X onto the external wall face 20e as shown in FIGS. 9, 10.

This holding means 205 is raised from the second opening portion 20b and extends up to the center portion of the width of the turned portion 13j. Then, a portion raised from the second opening portion 20b acts as a first guiding means 205a for guiding one side edge 13h of the turned portion 13j. Further, a portion extending from the first guiding means 205a to the center portion of the width of the turned portion 13j acts as an arm portion 205b. Still further, a tip of the arm portion 205b acts as a convex portion 205c for pressing the center portion of the width of the turned portion 13j onto the external wall face 20e.

On the bottom of the first wall portion 201, a guiding member 206 for guiding the cable 13X is provided at a position corresponding to the interconnecting edge portion 204. This guiding member 206 comprises a second guiding means 206a for guiding the other side edge 13k of the turned portion 13j and a protrusion 206b protruding above the edge portion 13k. Then, the above first guiding means 205a and the second guiding means 206a guide the cable 13X in X direction with the cable 13X turned at 180°.

In the first guiding means 205a, the arm portion 205b continuous therewith prevents the side edge 13h of the cable 13X from floating apart from the external wall face 20e. Further, in the second guiding means 206a, the protrusion 206b prevents the other side edge 13k of the cable 13X from floating apart from the external wall face 20e.

On the other hand, the second wall portion 202 has an engagement protrusion 20g (see FIG. 8 or 11 for example) which is engaged with an engagement hole (not shown) provided in the holder portion 11b to prevent the cable holding structure 21 from slipping out of the holder portion 11b when the cable holding structure 21 is inserted into the holder portion 11b of the rotary member 11 shown in FIG. 1.

Further, the cable holding structure 22 is also constructed in the same manner as the above cable holding structure 21. The engagement protrusion 20g of the cable holding structure 22 is engaged with an engagement hole (not shown) provided in this holder portion 12c when the cable holding structure 22 is inserted into the holder portion 12c of the fixed member 12 shown in FIG. 1.

Further, in the respective cable holding structures 21, 22, the holding means 205 presses the turned portion 13j of the cable 13X against the external wall face 20e by a pressing force from the respective holder portions 11b, 12c.

In the cable holding structure 21 having the above described construction, by inserting the overlapping portion 13i of the cable 13 into the groove 20 formed between the first wall portion 201 and the second wall portion 202, the overlapping portion 13i is placed so as to be nipped by the first wall portion 201 and the second wall portion 202. At this time, the side edge 13h of the cable 13X extending in X direction contacts the stopper 20d provided on the first wall portion 201 and the side edge 13g of the cable 13Y extending in Y direction contacts the stopper 20c provided on the second wall portion 202.

Thus, when for example, the cable 13X is intended to be pulled out in X direction, the side edge 13g of the cable 13Y comes into a contact with the stopper 20c so that it cannot be pulled out. Further, when the cable 13Y is intended to be pulled out in Y direction, the side edge 13h of the cable 13X comes into a contact with the stopper 20d so that it cannot be pulled out. Thus, the cable 13 can be held securely.

Further, because the overlapping portion 13i of the cable 13 is only inserted into the groove 20 formed between the first wall portion 201 and the second wall portion 202, no residual stress is generated in the cable 13 by resin of high temperatures and high pressure produced by insert molding unlike in the related art. Thus, the service life of the cable 13 can be improved.

Further, because the first wall portion 201 has the holding means 205 for holding the cable 13X by pressing the turned portion 13j thereof against the external wall face 20e, a friction occurs between this turned portion 13j and the external wall face 20e and between the turned portion 13j and the holding means 205. Thus, the cable 13 can be held more firmly.

Further, the cable 13X turned by the first guiding means 205a and the second guiding means 206a along the external wall face 20e of the first wall portion 201 can be introduced in a predetermined direction. Thus, the direction of the cable 13X can be stabilized.

Further, when the respective cable holding structures 21, 22 are inserted into the respective holder portions 11b, 12c, the holding means 205 presses the turned portion 13j of the cable 13X against the external wall face 20e of the first wall portion 201 by receiving a force applied from the holder portions 11b, 12c. Thus, the cable 13 can be held further firmly.

In the third embodiment of the present invention, although the first wall portion 201 and the second wall portion 202 are structured so as to face each other, it is permissible that the first wall portion 201 and the second wall portion 202 are constructed so that a distance therebetween becomes narrower toward the first and second opening portions 20a, 20b. In this case, the side edge 13h of the cable 13X comes to contact the stopper 20d securely and the side edge 13g of the cable 13Y comes to contact the stopper 20c more securely. Thus, the cable 13 can be held further firmly.

Although the above embodiments are structured so as to dispose the holding means 205 and the guiding member 206 on the first wall portion 201, the holding means 205 and the guiding member 206 may be provided on the second wall portion 202 or both the first and second wall portions 201, 202. Then, if the holding means 205 and the guiding member 206 are provided on the second wall portion 202, the cable 13Y extending in the other direction of Y can be also turned back along the external wall face of the second wall portion 202.

Further, although the above embodiments are structured so that the one cable 13X and the other cable 13Y are crossed orthogonally by turning back the cable 13 at the bent portion 13*e* oriented at 45°, it is permissible that the cable 13X and the other cable 13Y are crossed at an other angle than right angle by orienting the bent portion 13*e* at an other angle than 45°. In this case however, it is necessary that the first and second opening portions 20*a*, 20*b* and the stoppers 20*c*, 20*d* are structured so as to correspond to the directions of the respective cables 13X, 13Y and the respective side edges 13*h*, 13*g*.

What is claimed is:

1. A cable holding structure to be fitted with a bent portion of a cable formed in a belt-like shape by bending the cable at a predetermined portion thereof, comprising:

a body portion having a groove into which the bent portion of said cable is to be secured, a first opening portion through which said cable extending in a first direction from said bent portion passes, and a second opening portion through which said cable extending in a second direction from said bent portion passes, said first and second opening portions being contained by said groove; and a stopper provided on said first opening portion of said body portion, which contacts a side edge of the cable extending in said second direction of said bent portion so as to prevent said bent portion from slipping out in said first direction;

wherein the holding structure is removably mounted into a rotating member of a relay device.

2. A cable holding structure as claimed in claim 1, further comprising; a stopper provided on said second opening portion, which contacts a side edge of the cable extending in said first direction of said bent portion so as to prevent said bent portion from slipping out in said second direction.

3. A cable holding structure as claimed in claim 2, wherein said groove is constructed by a first wall portion and a second wall portion, an appropriate side of said first wall portion and said second wall portion including a guiding face for turning back at least one of said cables extending in said first and second directions along one external wall face of said first wall portion and said second wall portion.

4. A cable holding structure as claimed in claim 2, wherein said groove comprises a first wall portion and a second wall portion; and one of said first wall portion and said second wall portion is provided with a guiding means located on an appropriate side of one of said first wall portion and said second wall portion to guide said turned portion of the cable in a predetermined direction along said external wall face.

5. A cable holding structure as claimed in claim 2, wherein said groove comprises a first wall portion and a second wall portion; and one of said first wall portion and said second wall portion is provided with a holding means to hold the cable such that the turned portion of said cable is pressed against the external wall face of one of said first wall portion and said second wall portion.

6. A cable holding structure as claimed in claim 5, wherein the one of said first wall portion and said second wall portion which is provided with said holding means is further provided with a guiding means located on an appropriate side of one of said first wall portion and said second wall portion to guide said turned portion of the cable in a predetermined direction along said external wall face.

* * * * *